US 8,249,074 B2

(12) United States Patent
Borghs

(10) Patent No.: US 8,249,074 B2
(45) Date of Patent: Aug. 21, 2012

(54) AUTOMATIC REPEAT REQUEST WITH ADAPTIVE LATENCY

(75) Inventor: Eric Frans Elisa Borghs, Geel (BE)

(73) Assignee: Alcatel Lucent, Paris (FR)

( * ) Notice: Subject to any disclaimer, the term of this patent is extended or adjusted under 35 U.S.C. 154(b) by 1091 days.

(21) Appl. No.: 10/320,506

(22) Filed: Dec. 17, 2002

(65) Prior Publication Data

US 2003/0133414 A1 Jul. 17, 2003

(30) Foreign Application Priority Data

Dec. 18, 2001 (EP) .................................... 01403278

(51) Int. Cl.
*H04L 12/28* (2006.01)
(52) U.S. Cl. .......................... 370/394; 370/474; 370/325
(58) Field of Classification Search .................. 714/748, 714/749
See application file for complete search history.

(56) References Cited

U.S. PATENT DOCUMENTS

| 5,557,632 | A | * | 9/1996 | Kaku et al. .................... 375/340 |
| 5,636,230 | A | * | 6/1997 | Marturano et al. ............ 714/748 |
| 5,636,320 | A | * | 6/1997 | Yu et al. ......................... 392/416 |
| 5,832,384 | A | * | 11/1998 | Balachandran et al. ....... 455/450 |
| 6,128,763 | A | * | 10/2000 | LoGalbo et al. ............... 714/774 |
| 6,496,520 | B1 | * | 12/2002 | Acosta .......................... 370/474 |
| 6,631,115 | B1 | * | 10/2003 | Sendelbach et al. ........... 370/229 |
| 2002/0080719 | A1 | * | 6/2002 | Parkvall et al. ................ 370/235 |

FOREIGN PATENT DOCUMENTS

WO    WO 0122645 A    3/2001

OTHER PUBLICATIONS

Sunghyun Choi et al, "A Class of Adaptive hybrid ARQ Schemes for Wireless Links", IEEE Transactions on Vehicular Technology, vol. 50, No. 3, May 2001, pp. 777-790.

* cited by examiner

*Primary Examiner* — Robert Wilson
(74) *Attorney, Agent, or Firm* — Sughrue Mion, PLLC

(57) ABSTRACT

In a transmission environment, such as a wireless environment, the communication channel 23 may be subject to noise bursts 27, 28. When the transmitter 2 sends a frame 24(8) to the receiver, it may collide with a noise burst 28. The receiver 4 is adapted to send a retransmission request, 25(8) Original, when it receives corrupted data from transmitter 2. The duration of the noise may be sufficient to also interfere with the request, 25(8) Original. The receiver includes channel monitoring means to detect noise and to delay the sending of the retransmission request, 25(8) Delayed, based on the level of the noise.

13 Claims, 5 Drawing Sheets

AUTOMATIC REPEAT REQUEST WITH ADAPTIVE LATENCY

FIELD OF THE INVENTION

This invention relates to error correction in a transmission environment subject to noise bursts of varying durations, using an Automatic Repeat Request (ARQ) technique in which a receiving unit requests a sending unit to resend data which has been corrupted by a noise burst.

BACKGROUND OF THE INVENTION

Communication channels, such as wireless channels and other channels carrying digital communication, are subject to noise. The noise can be difficult to characterize, as it depends on the environment of the communication system. Noise bursts can corrupt large parts of a message as it may disturb a channel for a relatively long time. The noise bursts can be widely distributed geographically and can also vary in duration and noise level.

Typically messages are encapsulated in a frame structure and transmitted in sequential frames over a down channel from the transmitting unit to a receiving unit. In some transmission systems, in order for the transmitting unit to have assurance that the message is received correctly, the receiving unit transmits some form of acknowledgment signal to the transmitting unit over an up channel.

It is known to use automatic repeat requests (ARQ), possibly combined with forward error correction, to cause uncorrectable frames to be retransmitted until they are received correctly, or until a maximum permitted number of repeat requests is reached.

The article "A Class of Adaptive Hybrid ARQ Schemes for Wireless Links" Sunghyun Choi, FEEE Transactions on Vehicular Technology, Vol. 50, No. 3, May 2001, discusses three correction schemes including a system using an adaptive hybrid forward error correction (FEC) and ARQ using Reed Solomon code. The paper describes the selective-repeat ARQ in which the sender transmits frames without waiting for an acknowledgement (ACK) or negative acknowledgement (NAK) of frames already transmitted. this version of ARQ has better throughput than the "stop-and-wait" or the "go-back-N" versions. If the receiver is unable to correct errors using the FEC, it sends a NAK signal to the transmitter initiating re-transmission of the corrupted frame or code segment depending on the specific ARQ implementation. The NAK frame includes four bytes, the first two bytes being used to identify the frame number, the third identifying (a) whether the response is ACK or NAK and (b) adapted code rate, and the last being a check-sum. In addition, if neither ACK/NAK is not received by the transmitter within a timeout interval, the frame is retransmitted. The timeout is based on the round trip delay.

The current forms of ARQ can be effective against some forms of noise, but particularly where the noise is of long duration, the "fixed-delay" ARQ may suffer interference when the noise is still present in the channel. If the number of ARQ repeats does not exceed the maximum permitted number, it may still be possible for a repeat ARQ to be sent to request the retransmission. However, for each retransmission the latency is increased with the round trip delay and the throughput of the system can drop significantly. This may be unacceptable where latency and throughput are important. The automatic retransmission of packets when an ACK is not received can reduce the effective bandwidth of the channel by causing the unnecessary retransmission of frames which have been correctly received and only the ACK signal has been corrupted.

SUMMARY OF THE INVENTION

It is an object of the invention to provide a method of reducing the effect of interference with a response signal sent to notify a transmitting unit that its transmission has been corrupted by a noise burst, the method reducing the probability that the response signal will be corrupted by the noise burst.

According to a first aspect of the invention there is provided a method of reducing interference with a response signal sent from a reception unit to a transmission unit in a transmission environment subject to noise bursts when the reception unit has received data from the transmission unit corrupted by bursts noise in the transmission environment, the method being characterized by the following steps:
  monitoring a variable condition of the channel, and
  delaying the response signal for a delay period based on the monitored condition of the channel.

The invention further provides a response generation arrangement for reducing the effect of noise bursts on a response signal transmitted in an environment subject to noise, the arrangement including:
  noise evaluation means to directly or indirectly evaluate a characteristic of noise on a channel,
  delay means to delay transmission of the response signal based on the characteristic of the noise.

The channel condition may be monitored directly by directly monitoring the presence of noise. Alternatively, or in addition, the channel condition may be monitored indirectly by monitoring the uncorrupted reception of a data frame. Monitoring may include one or more of the following:
  testing to see if the energy of the received signal is abnormally high during a certain time interval;
  checking for known patterns of impulse noise or noise bursts;
  checking for consecutive erroneous packets.

The noise patterns may be determined by measuring and characterizing the medium (wireless, cable, copper pair, etc.).

The invention still further provides a system for transmitting framed data over a channel from a transmitting unit including first transmission and reception means to a reception unit including second transmission and reception means, the reception unit including the aforegoing response generation unit, and the transmission unit including means responsive to a delayed response from the reception unit indicating reception of at least one corrupted frame of data to retransmit the corrupted frame or frames.

DETAILED DESCRIPTION OF THE EMBODIMENTS

Figure 1:
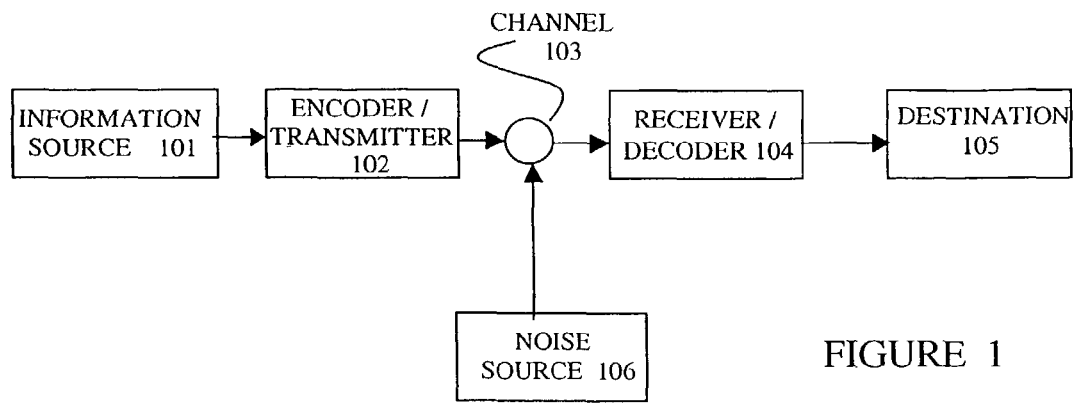
FIG. 1 shows a block diagram of a communication system with a noise source shown illustratively as a noise generator interfering with a communication channel.

FIG. 1 represents a data source 101 connected to a transmitting unit 102 transmitting data over a channel 103 to a receiving unit 104 connected to a destination 105. The channel 103 is subject to noise and this is represented by a noise source 106 which produces noise which may corrupt the transmission of data between the transmitting unit 102 and the receiving unit 104.

Figure 2:
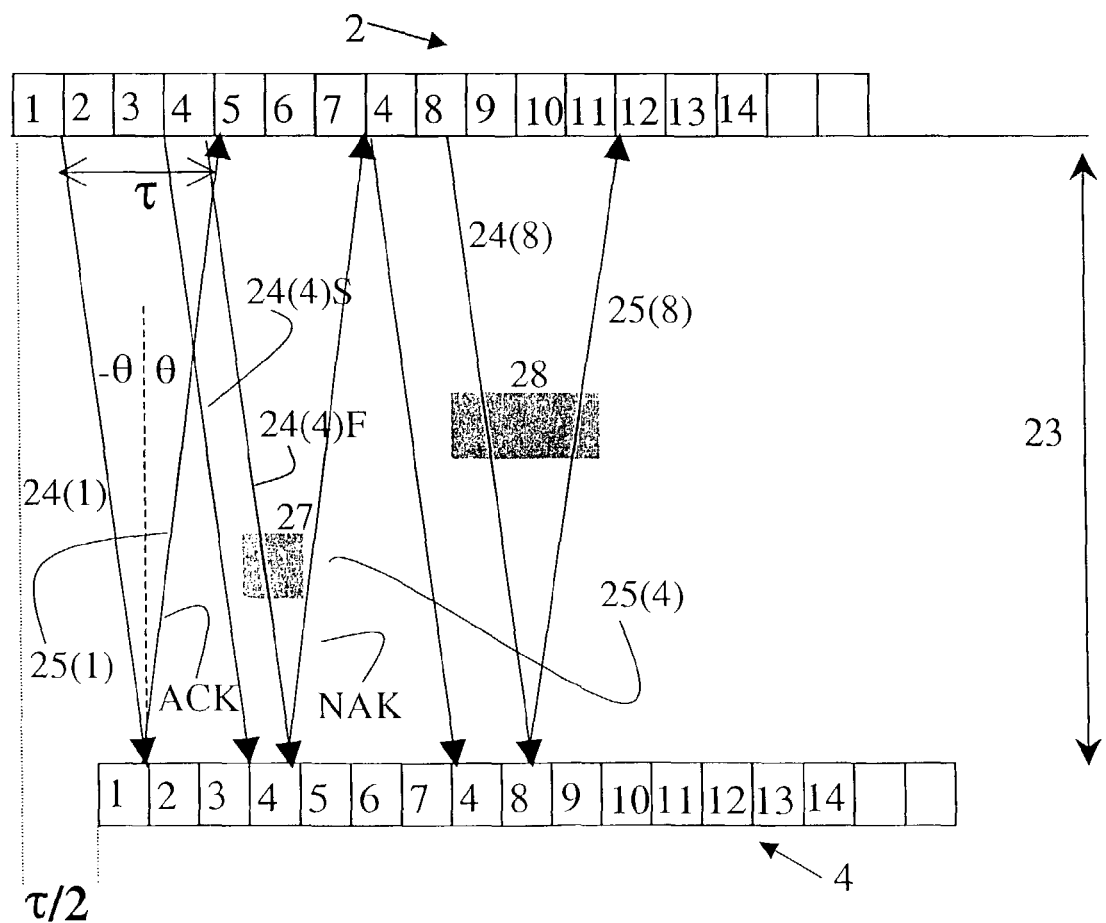
FIG. 2 shows is a space/time diagram illustrating the operation of an ARQ system between a transmitting unit and a receiving unit.

The space/time diagram in FIG. 2 represents the transfer of signals from the transmitting unit to the receiving unit across an intervening distance 23. The horizontal direction represents time and the vertical distance represents the displacement in space. In this example, we will assume that the transmission is wireless transmission. As shown in FIG. 2, the transmission of frame 1 space between the transmitter 102 and the receiver 104 is represented by the arrow 24(1). This arrow is a purely figurative representation of the space/time location of the frame being transmitted. Assuming that the distance between the transmitter and the receiver is constant and ignoring variables such as multipath fading, the transmission time will remain constant. This is represented by the angle of the arrow 24(n) remaining constant for each down-link transmission. The uplink transmissions also travel at the same speed, so the arrows 25(n) representing the uplink transmissions have the same angle in the reverse direction so they appear at an equal and opposite angle to the vertical with reference to the down-link arrows. The transmission medium may be air or cable.

Also shown in FIG. 2 are two noise bursts 27 and 28 which appear unpredictably between the transmitter and the receiver, and are of varying durations.

In FIG. 2, the frame numbered 1 from the transmitter 102 arrives uncorrupted along arrow 24(1) at the receiver shifted in time by $\tau/2$, half the round trip delay $\tau$, ie, $\tau/2$ is the time taken by the signal to travel the distance between the transmitter 102 and the receiver 104. The receiver 104 transmits an acknowledgment signal to the transmitter along arrow 25(1). This ACK signal arrives after a half round trip delay at a time corresponding with the frame 4 in this example although on a different frequency channel, assuming the channels are not time shared. In the meantime, the transmitter has continued to send data frames. Frames 2 and 3 arrive safely at the receiver. The ACK responses for the reception of these signals is omitted from the drawing for the sake of clarity, but frame 4, transmitted on arrow 24(4), collides with the noise burst 27 during transmission and is corrupted. It should be noted that the frame 4 takes a finite time to pass across any point in the channel. This finite time corresponds to the frame duration and is represented by the arrows 24(4)S, the start of transmission of frame 4 and 24(4)F, the finish of transmission of frame 4. The receiver recognizes the frame 4 is corrupted by the noise burst 27 and sends an NAK signal along arrow 25(4) to the transmitter.

Because the noise burst is narrow (of short duration), the NAK sent on arrow 25(4) arrives at the transmitter 102 without interference during frame 7. Thus the transmitter 102 is able to receive and understand the NAK requesting re-transmission of the frame 4 while it is sending frame 7. The transmitter responds by resending frame 4 after it has sent frame 7. Frame 4 may be retransmitted immediately after frame 7 or after a later frame depending on the arrival time of the NAK sent on arrow 25(4).

In the example in FIG. 2, the transmitter 102 next sends frame 8 on arrow 24(8). This collides with noise burst 28 and is corrupted before arriving at the receiver 104. In response to the reception of the corrupted frame 8, the receiver 104 sends an NAK on arrow 25(8). In this case, the noise burst 28 is of longer duration than noise burst 27 and is still affecting reception at transmitter 102 when the NAK arrow 25(8) reaches transmitter 2. Thus this NAK is corrupted, and the transmitter 102 is not able to respond to it.

The receiver 104 anticipates the reception of retransmitted frame 8 after the round trip delay. If this is not received within the expected time window, receiver 104 will again send the NAK requesting re-transmission of the frame 8, until the number of permitted repeats has been used or the frame is received. Each time the NAK is transmitted there is a round trip delay to be accounted for and if the faulty frame is not received within a time window determined by the system specification, the frame will be lost. Even if one of the following NAKs is successfully received by the transmitter and frame 8 is re-transmitted, the latency of the system is increased by the number of retries times the round trip delay plus any internal delays, as the received message cannot be reassembled until the missing frame is received.

Looking at the noise burst 28, it is seen that the burst has a spread in time and may also have a spread in space, its width representing its time spread, and its height representing the spread in space. Thus, any down-link signal (the arrows sloping down to the right) which falls inside the lower left corner and the upper right corner will suffer interference. Similarly, any uplink signal which falls between the upper left corner and the lower right corner will suffer interference during transit to the transmitter. In some cases, the spread in space may be negligible compared with the spread in time.

The invention proposes a process of monitoring the channel to determine the distribution of the noise in time and delaying the transmission of the ARQ until after the noise burst has finished or fallen to a level where it will not substantially corrupt the data.

Figure 3:
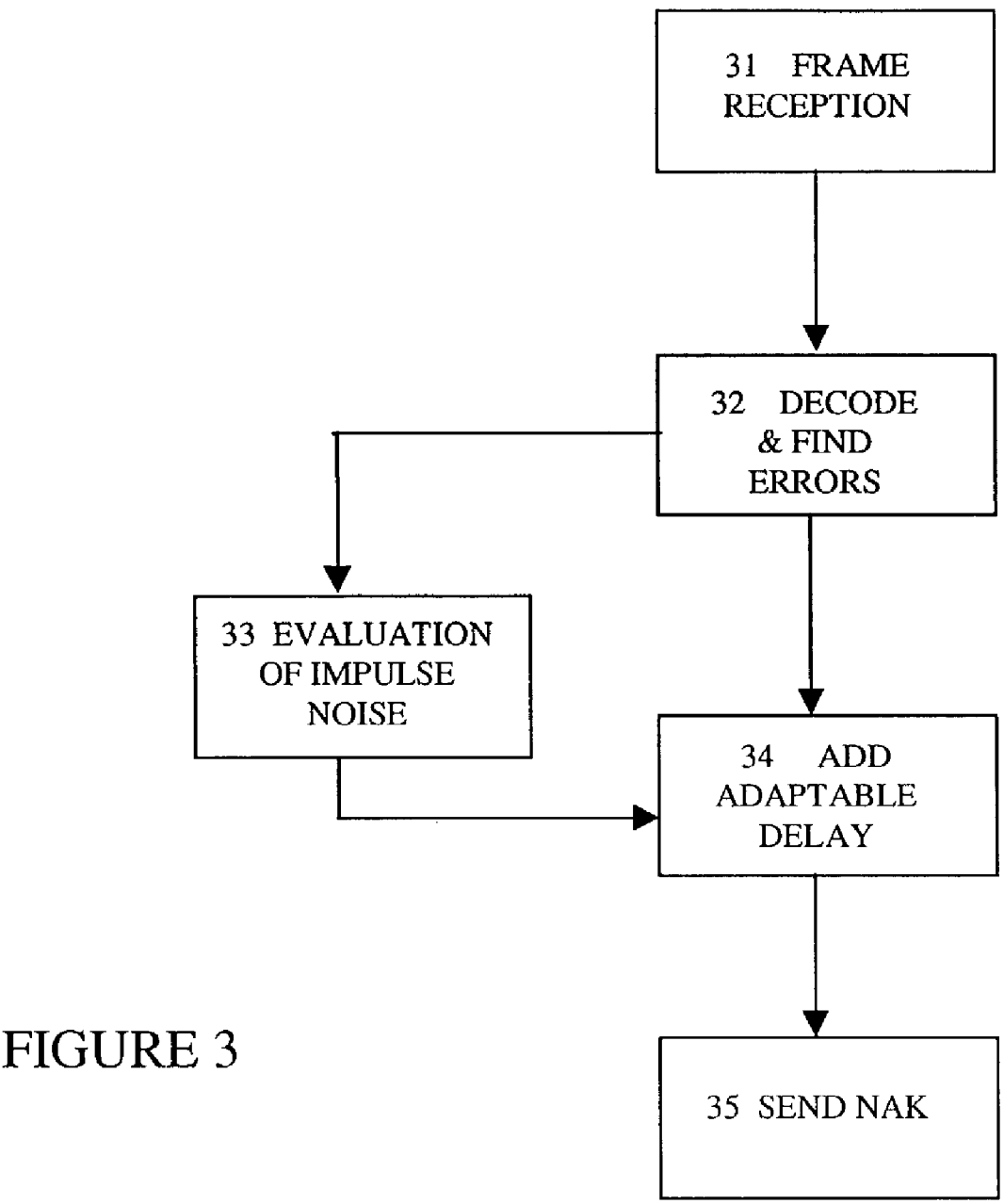
FIG. 3 shows is a block diagram of an arrangement in a receiver implementing an embodiment of the invention.

FIG. 3 illustrates the functional blocks for achieving this result.

In FIG. 3, the packet or frame is received at 31. The receiver decodes the data at stage 32 and finds uncorrectable errors. The receiver continues to monitor the received data until it recognizes that the error source has ceased at stage 33. This may be done, eg, by recognizing when an uncorrupted packet is received. The receiver can thus identify the corrupted packet or packets. The receiver delays the transmission of the NAK until the noise burst ceases or falls below a predetermined threshold, as is shown at 34. Once the receiver recognizes that the noise burst has ended, it sends an NAK requesting the retransmission of the missing packet or packets, as shown at step 35.

Figure 4:
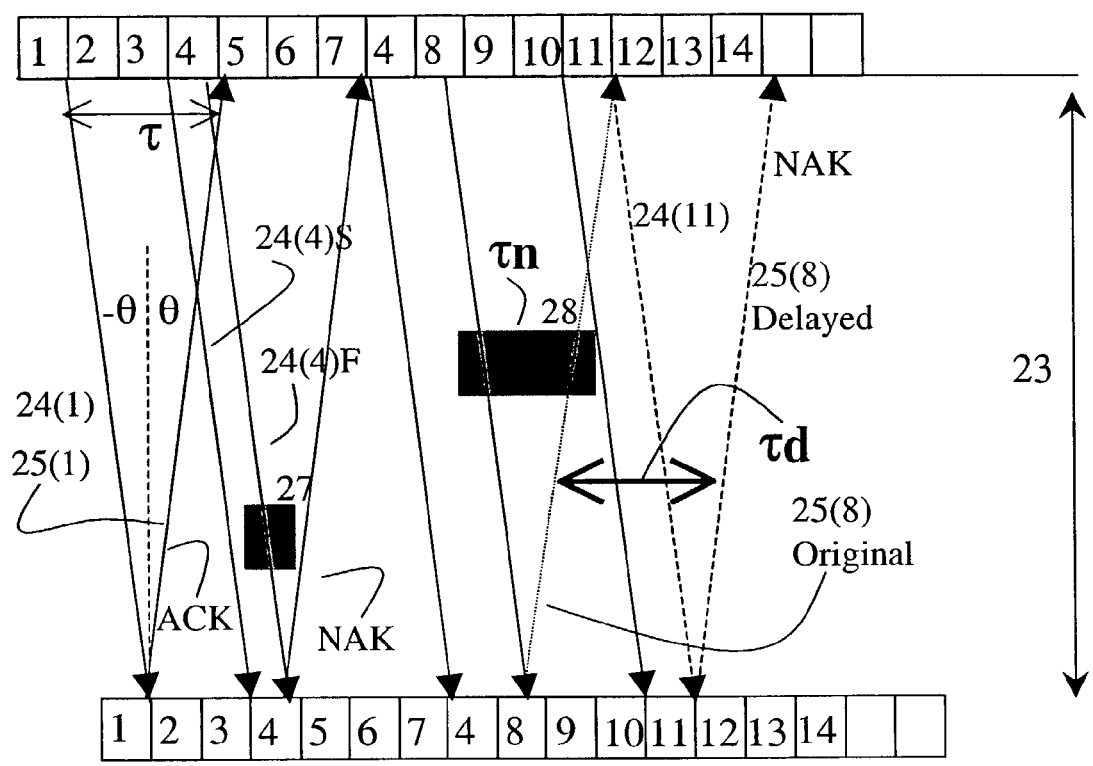
FIG. 4 shows is a space/time diagram illustrating the operation of the invention

This is represented in the space-time chart of FIG. 4, where the action in relation to the earlier packets is the same as in FIG. 4. However, the response to the corruption of packet 8 by the noise burst 28, which has a duration $\tau n$, is different. Receiver 104 recognizes that the packet received after retransmitted packet 4 is corrupted, and that the next uncorrupted packet is packet 11, because both packets 9 and 10 are also corrupted by the noise burst 28, as well as packet 8. As a result, receiver 104 delays sending the NAK request for the retransmission of packet 8 until it recognizes that the noise burst has ended. Thus the NAK 25(8) is not sent until after the clear reception of packet 11. In one embodiment, the NAK may be modified to request the retransmission of the three corrupted packets, 8, 9, and 10. Alternatively, single NAKs may be sent for each of the three corrupted packets.

Figure 5:
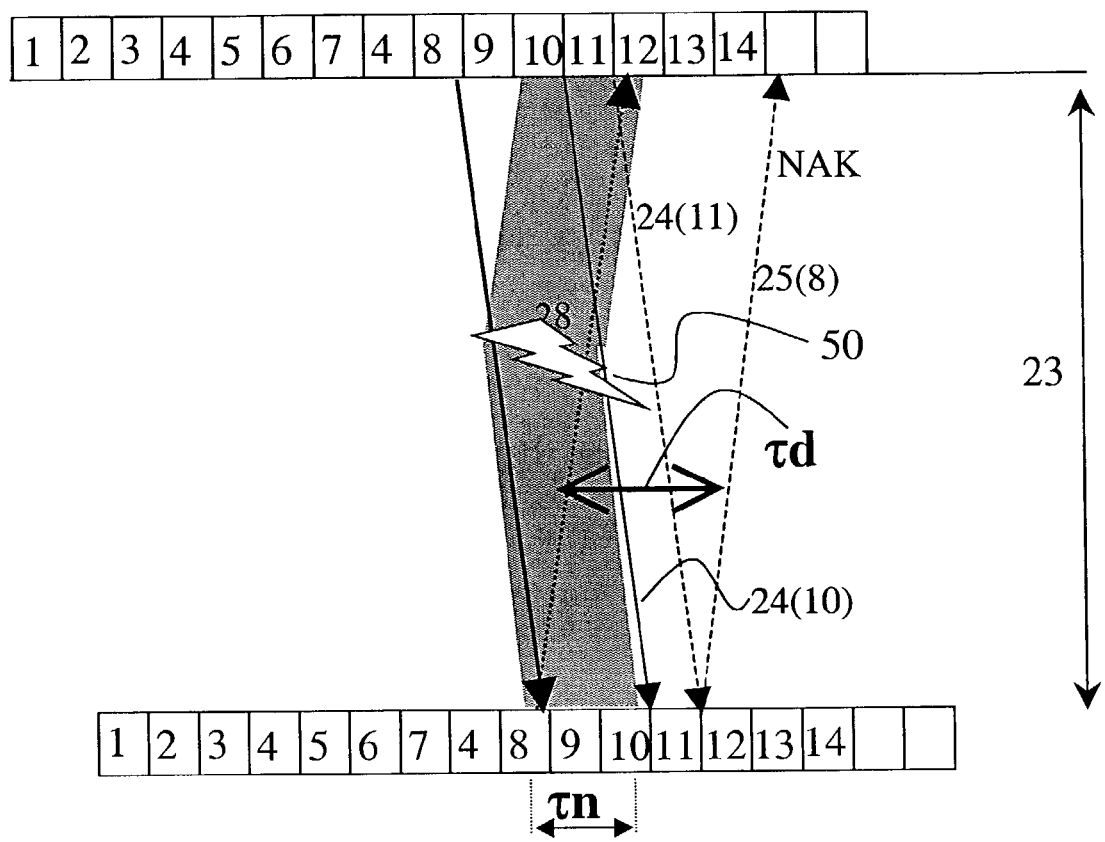
FIG. 5 shows a detail of the effect of a noise burst on the receiver and transmitting units.

FIG. 5 shows in a more detailed manner a method of representing interference in a wireless environment. The noise burst spreads from the noise source 50 in both directions, towards the receiver 104 parallel to the arrows 25(n), and towards the transmitter 102, parallel to the arrows 24(n), causing interference to the data signals which arrive at the transceivers at either end at the same time as the noise burst. Thus, as shown in FIG. 5, any signal from the receiver end 104 arriving at the transmitter end 102 during the packet periods for packets 10 and 11 will suffer interference from the noise burst 50. Similarly, at least some of the data arriving at the receiver end during the period 8, all of the data arriving during period 9, and some of the data during period 10 will suffer interference from the noise burst 50.

There is thus an alternative method of determining when the noise burst has ceased. This may be done by monitoring for the noise directly, rather than by detecting the clear reception of a packet. However, if the noise ceases during a packet, the initial part of the data of that packet will be corrupted and the packet may need to be retransmitted.

It should also be noted that the noise burst may not produce substantial interference with the "non-parallel" data which transects it. Thus the data from packet 11 transmitted by transmitter 102 is not interfered with by the arrival of the noise burst 50 at transmitter 102. However, the packet 24(8) is interfered with by the "parallel" noise burst arriving simultaneously at the receiver 104.

Figure 6:
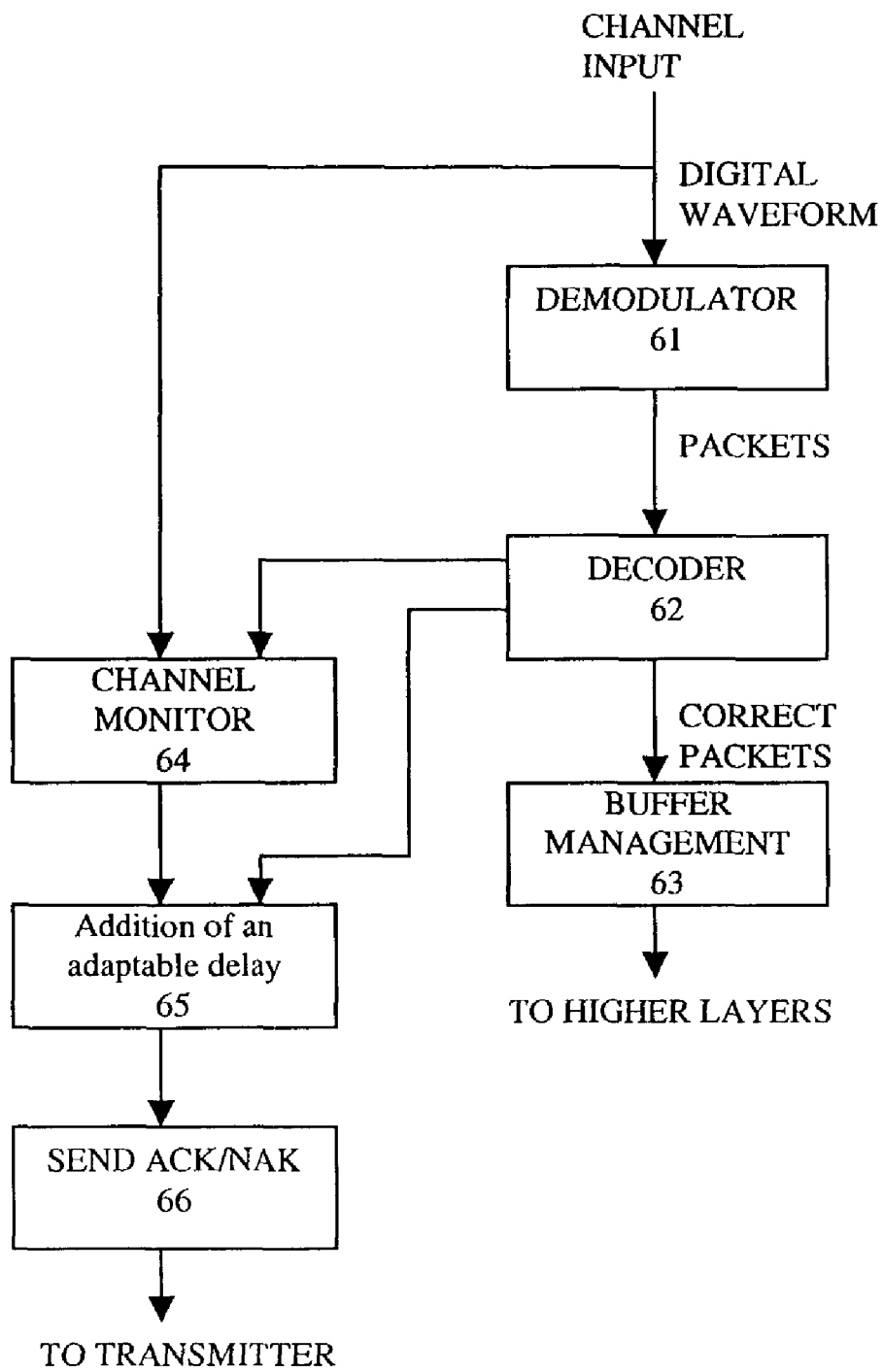
FIG. 6 shows a functional block diagram of a receiver embodying the invention

FIG. 6 shows a functional block diagram of the receiver functions embodying the invention. The channel input is applied to a demodulator 61 and the output of the demodulator is applied to a decoder 62. Where the decoder is able to decode packets, these are forwarded for further handling or processing, eg to buffer manager 63. The channel input is also applied to channel monitor 64 which controls the addition of an adaptable delay 65 before the transmission of the ACK/NAK response 66. The adaptable delay 65 may also be controlled from the decoder if it is unable to decode a number of consecutive packets, indicating the presence of a disturbance on the channel.

The input of the demodulator is a stream of digital waveforms. The demodulator does all operations necessary to convert this stream to a stream of packets. This packet-stream is delivered to the decoder. The decoder decodes and possibly corrects the bits contained in the packet according the selected error correction scheme. The output of the decoder is an error-free packet stream on the one hand, or, where applicable, an indication of an uncorrectable packet of bits. The error-free packet-stream is the input of the buffer management block. This block aligns all packets in the correct order before they are delivered to the higher layers of the device. The channel monitor block monitors the channel in order to detect the presence of burst noise. The inputs of this block come from either the channel or the decoder, or from both. The presence/absence of noise controls the addition of an adaptable delay to the response of the received packets.

In an alternative embodiment, the transmitter monitors the channel conditions and interrupts transmission where the transmitter detects an unfavourable noise environment. This may be of particular use in an environment which is subject to noise bursts of relatively long duration compared to the frame duration. One such environment may occur during a period of high solar flare activity when wireless transmissions can be disrupted for long intervals. One advantage of such a technique is that the amount of time required for reassembly of frames into correct sequence may be reduced in some cases. This technique can be applied together with the technique of sending delayed NAK signals from the receiver. In particular, the cessation of transmission is arranged to operate if the transmitter detects that the noise burst has a duration greater than a predetermined threshold period. Thus the receiver send NAK signals for noise bursts having a duration to the predetermined threshold period, but for longer noise bursts the receiver is programmed to recognize that the transmitter has stopped transmitting. After such a prolonged outage, it would normally be necessary to reinitialize the communication. The transmitter needs to have sufficient memory to retain the frames transmitted during the noise burst at least up to the threshold period. Thus the threshold period acts as a "bookmark" so that the communication can be reestablished from the time the noise burst commenced.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. A method of reducing interference in a transmission environment subject to noise, the method comprising:
    receiving, at a reception unit, a first labeled data segment sent from a transmission unit, the labeled data segment corrupted by noise in the transmission environment;
    directly or indirectly monitoring one or more channel conditions at the reception unit;
    delaying a first response signal requesting retransmission of the first labeled data segment for a delay period based on the monitored channel conditions; and
    transmitting said first delayed response signal to the transmission unit.

2. A method as claimed in claim 1, wherein the monitored channel condition is the presence of noise.

3. A method as claimed in claim 2, wherein a characteristic of the noise is monitored directly and the first response signal is transmitted after the level of the noise has fallen below a predetermined level.

4. A method as claimed in claim 1, wherein the reception unit includes noise evaluation means which directly monitors the level of noise on the channel, the method further comprising:
    evaluating the level of momentary noise on the channel; and
    delaying the first response signal based on the level of momentary noise.

5. A method as claimed in claim 4, wherein the reception unit includes noise evaluation means and response delaying means, the method further comprising:
    using the noise evaluation means to evaluate the characteristics of momentary noise; and
    using the delaying means to delay the first response signal based on the characteristics of noise.

6. A method as claimed in claim 1, wherein the reception unit includes received signal energy evaluation means which directly monitors the energy of the received signal during a predetermined period, the method further comprising:
    evaluating the energy of the received signals; and
    delaying the first response signal until the energy of the received signal falls below a predetermined threshold.

7. A method as claimed in claim 1, wherein the first labeled data segment is received from the transmission unit in frames or packets, and the reception unit monitors the data frames or packets to determine indirectly the channel characteristics and requests re-transmission of corrupted frames or packets based on the channel characteristics which permit uncorrupted reception of a frame or packet.

8. The method of claim 1, wherein the first delayed response signal is transmitted after receiving at the reception unit an uncorrupted second labeled data segment sent from the transmission unit, the second labeled data segment transmitted from the transmission unit after the first labeled data segment.

9. A response generation arrangement for reducing the effect of noise in an environment subject to noise bursts, the arrangement configured to be included in a
- a transceiver which receives a labeled data segment including framed data over a channel and sends a first response signal over the channel in response to the received labeled data segment being corrupted, the arrangement comprising:
- noise evaluation means to directly or indirectly evaluate characteristics of the channel; and
- delay means to delay transmission of the first response signal after the reception unit receives the data from the transmission unit.

10. A response generation arrangement as claimed in claim 9, further comprising:
- a reception unit including a noise monitor monitoring a channel for the presence of noise having predetermined characteristics; and
- delay means for delaying the transmission of the first response signal until the characteristics of the noise are within an acceptable range.

11. A system for transmitting framed data over a channel from a transmission unit to a reception unit, the system comprising:
- the transmission unit, wherein the transmission unit is configured to: transmit the data to the reception unit,
- receive a delayed response signal from the reception unit, the delayed response signal indicating reception of at least one corrupted frame of data, and
- retransmit the at least one corrupted frame of data to the reception unit in response to receiving said delayed response signal from the reception unit; and
- the reception unit configured to receive said data transmitted from the transmission unit;
- transmit said delayed response signal to said transmission unit;
- monitor a channel for the presence of noise having predetermined characteristics; and
- delay transmission of the response signal to data received from the transmission unit, until the characteristics of the noise are within an acceptable range, after the reception unit receives the data from the transmission unit.

12. A method of controlling data transmissions over a link from a transmitter to at least one receiver in an environment subject to noise, the method comprising:
- monitoring the link for noise at the transmitter end; and
- ceasing transmission from the transmitter to the at least one receiver, in response to one or more of the noise characteristics exceeding an associated predetermined threshold for a predetermined period;
- delaying transmission of a first response signal from the at least one receiver to the transmitter for a delay period based on a condition of the link directly or indirectly monitored at the receiver; and
- transmitting the first response signal to the transmitter after the delay period,
- wherein:
- the delay period is equal to or greater than the predetermined period, and the first response signal is transmitted by the receiver in response to receiving a corrupted labeled data segment from the transmitter.

13. A method of claim 12, wherein the first response signal is a retransmission request.

* * * * *